(12) United States Patent
Drost

(10) Patent No.: US 7,616,926 B2
(45) Date of Patent: Nov. 10, 2009

(54) CONDUCTIVE DC BIASING FOR CAPACITIVELY COUPLED ON-CHIP DRIVERS

(75) Inventor: Robert J. Drost, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 490 days.

(21) Appl. No.: 11/647,060

(22) Filed: Dec. 27, 2006

(65) Prior Publication Data
US 2008/0159412 A1 Jul. 3, 2008

(51) Int. Cl.
*H04B 5/00* (2006.01)
*H03K 17/16* (2006.01)
*H03K 19/003* (2006.01)

(52) U.S. Cl. .................. 455/41.1; 455/67.11; 455/295; 455/296; 326/21; 326/30

(58) Field of Classification Search ................ 455/41.1, 455/67.11, 67.13, 295, 296, 310; 326/21, 326/30, 31, 34; 327/362
See application file for complete search history.

(56) References Cited

U.S. PATENT DOCUMENTS

| 5,029,140 | A | * | 7/1991 | Krilic | 365/222 |
| 5,254,883 | A | * | 10/1993 | Horowitz et al. | 326/30 |
| 6,008,705 | A | * | 12/1999 | Ghoshal | 333/1 |
| 6,462,584 | B1 | * | 10/2002 | Proebsting | 327/52 |
| 6,657,460 | B2 | * | 12/2003 | Tang | 326/86 |
| 6,754,341 | B2 | * | 6/2004 | Scott et al. | 379/413 |
| 6,825,708 | B1 | * | 11/2004 | Drost et al. | 327/509 |
| 7,193,430 | B2 | * | 3/2007 | Ookawa | 326/26 |
| 7,408,395 | B2 | * | 8/2008 | Cao et al. | 327/307 |
| 7,412,221 | B2 | * | 8/2008 | Mohanavelu et al. | 455/295 |
| 2006/0075364 | A1 | | 4/2006 | Drost et al. | |

OTHER PUBLICATIONS

Publication: R. Drost, et al., *Challenges in Building a Flat-Bandwidth Memory Hierarchy for a Large-Scale Computer with Proximity Communication*, Symposium on High Performance Interconnects, pp. 13-22, Aug. 2005.

* cited by examiner

*Primary Examiner*—Duc M Nguyen
(74) *Attorney, Agent, or Firm*—Park, Vaughan & Fleming, LLP; Steven E. Stupp

(57) ABSTRACT

An integrated circuit containing a communication channel is described. This communication channel includes: a transmit circuit configured to transmit signals; a link coupled to an output of the transmit circuit; a receive circuit coupled to the link; and a clamping circuit coupled to the link. Note that the transmit circuit is capacitively coupled to the receive circuit via the link. Furthermore, the clamping circuit is configured to compensate for leakage current on the link by maintaining a voltage on the link corresponding to a logical "1" or a logical "0." This voltage is based on a history of the transmitted signals.

20 Claims, 16 Drawing Sheets

CONDUCTIVE DC BIASING FOR CAPACITIVELY COUPLED ON-CHIP DRIVERS

BACKGROUND

1. Field of the Invention

The present invention relates to techniques for communicating signals between electronic circuits. More specifically, the present invention relates to techniques for maintaining a DC-voltage level when communicating on-chip signals using capacitively coupled drivers.

2. Related Art

Communicating data over long on-chip signal lines or wires (also referred to as links) at high data rates in a communication channel consumes a significant portion of the total energy used by modern integrated circuit chips. Existing approaches to address this power-consumption problem include using capacitively coupled transmit drivers, which consume power when transmissions occur in transmitted signals.

However, there are limits to the performance improvement offered by this communication technique. For example, existing capacitively coupled transmit drivers block the DC-voltage level of the transmitted signals. As a consequence, if a signal is held or maintained for a sufficiently long period of time then the signal at the end of the line may leak away and cause errors.

A variety of DC-biasing techniques have been proposed to address this problem, including periodically refreshing the DC-voltage level and continuously averaging the DC-voltage level to generate a DC-balanced signal. While these techniques can establish a DC-voltage level, they may increase circuit complexity, power consumption, cost, and/or reduce the effective bandwidth of the communication channel. For example, delays may occur when the communication channel is taken off-line to refresh its DC-voltage level or when signals that are sent through the communication channel are encoded and decoded.

What is needed is a method and an apparatus that facilitates communicating on-chip signals using capacitively coupled drivers without the problems listed above.

SUMMARY

One embodiment of the present invention provides an integrated circuit containing a communication channel. This communication channel includes: a transmit circuit configured to transmit signals; a link coupled to an output of the transmit circuit; a receive circuit coupled to the link; and a clamping circuit coupled to the link. Note that the transmit circuit is capacitively coupled to the receive circuit via the link. Furthermore, the clamping circuit is configured to compensate for leakage current on the link by maintaining a voltage on the link corresponding to a logical "1" or a logical "0". This voltage is based on a history of the transmitted signals.

In some embodiments, the transmit circuit includes a voltage-mode driver or a current-mode driver.

In some embodiments, the clamping circuit sets a DC-bias voltage of the link.

In some embodiments, the clamping circuit includes a conductive driver in parallel with the link. Furthermore, the clamping circuit may be configured to disable the conductive driver for a given signal type in the transmitted signals. Note that the given signal type corresponds to one of the logical "1" and the logical "0". And in some embodiments, the transmitted signals are constrained to include a signal transition within a pre-determined time interval from a previous signal transition.

In some embodiments, the clamping circuit has an RC time-constant that is greater than a time-constant of a transient characteristic of the transmitted signals, where R is a resistance of a conductive path in the clamping circuit and C is a total capacitance of the link. Note that the transient characteristic provides pre-emphasis to the receive circuit.

In some embodiments, the clamping circuit is configured to disable the conductive driver for times less than a specified time interval, and to enable the conductive driver for times greater than the specified time interval. This specified time interval may correspond to the transient characteristic of the transmitted signals. Note that the specified time interval of the clamping circuit may be configured to be set using an adjustable delay element that has discrete time delays and/or continuous time delays. Furthermore, the clamping circuit may be configured to maintain the voltage for times longer than the specified time interval.

In some embodiments, a frequency response of the communication channel is approximately uniform from DC up to a frequency.

In some embodiments, the integrated circuit includes control logic that is configured to adjust the frequency response of the clamping circuit. This control logic may be configured to adjust the frequency response continuously and/or after a pre-determined time interval has passed since a last adjustment.

In some embodiments, the integrated circuit has an approximately constant latency when communicating data via the link.

In some embodiments, the receive circuit includes a single-ended amplifier or a differential amplifier.

Another embodiment provides a computer system that includes a processor, a memory, and the integrated circuit. Note that the memory is configured to store one or more program module mechanisms.

Another embodiment provides a method for maintaining the voltage on the link in the integrated circuit. During this method, signals are transmitted on the communication channel in the integrated circuit using a transmit circuit. In this embodiment the communication channel includes a capacitively coupled link between the transmit circuit and the receive circuit. Then, the transmitted signals are received through the receive circuit. Furthermore, the voltage on the link is maintained to compensate for leakage current on the link.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of an integrated circuit, a method, and a computer system that includes the integrated circuit are described. These circuits, systems, and/or processes may be used to maintain a DC-voltage level during intra-chip or on-chip communication of signals through a capacitively coupled communication channel. In particular, a parallel circuit path is added to the communication channel to apply DC biasing. This circuit path conveys the same polarity of information in the signals, but drives conductively instead of capacitively. Furthermore, rather than being a full-strength driver, this circuit path only acts as a keeper that weakly drives a given signal (such as one corresponding to a logical "1" or a logical "0") to hold or maintain the state of the signal after a capacitively coupled driver has placed the majority of the signal energy on the link.

In one embodiment, a weak conductively coupled driver is used. This driver has a resistance-capacitance (RC) time-constant that is long compared to the duration of a pre-emphasis pulse or spike generated by the capacitively coupled driver, i.e., a transient characteristic of the transmitted signals. Furthermore, in another embodiment the conductively coupled driver tri-states during each signal transition so that the RC time-constant of this driver may be smaller than the duration of the pre-emphasis spike. And in another embodiment, the conductively coupled driver tri-states for either a high or a low signal level. As a consequence, the conductive and capacitive swings may not be matched. However, an occasional signal transition may be needed to counteract long-term leakage. While this may entail an additional coding constraint, the coding may have a lower cost than existing DC-balanced codes because the required transition rate is low.

Note that the circuit path may ensure that a frequency response of the communication channel is approximately uniform from DC up to a frequency. Furthermore, in some embodiment control logic may adjust the circuit path to adjust the frequency response. For example, the control logic may be configured to adjust the frequency response continuously and/or after a pre-determined time interval has passed since a last adjustment.

Figure 1:
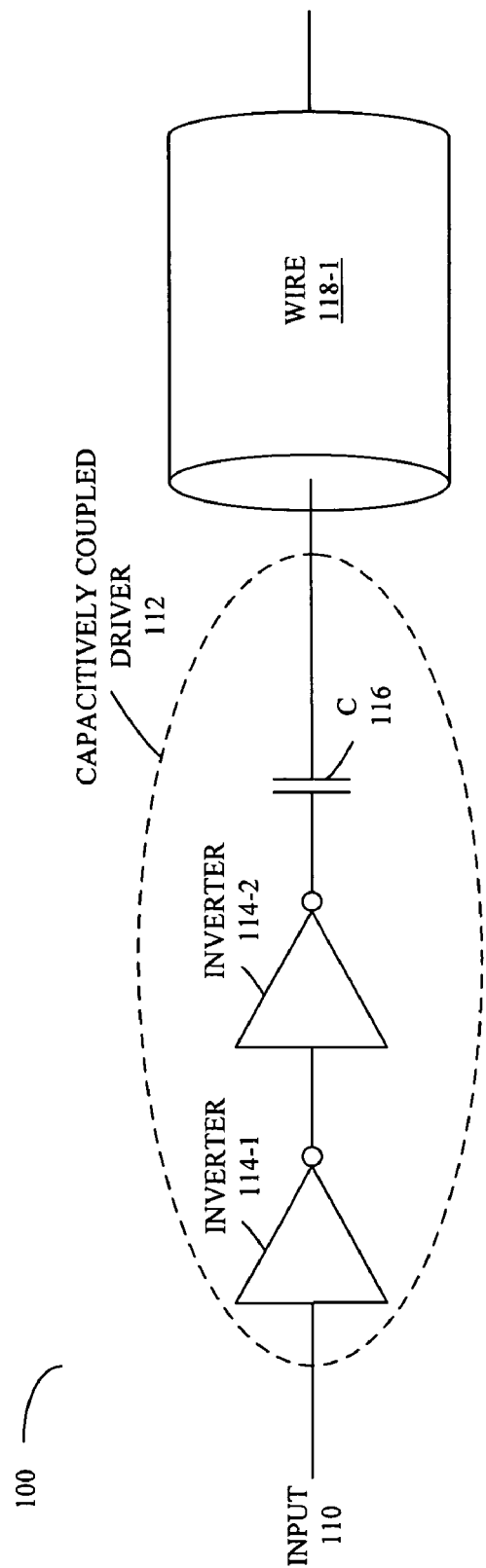
FIG. 1 is a block diagram illustrating an existing driver circuit.

We now describe embodiments of an integrated circuit containing a communication channel. FIG. 1 presents a block diagram illustrating an existing driver circuit 100. In this circuit, a capacitively coupled driver 112, which includes two inverters 114, receives an input 110 and generates a fall-swing signal. This signal is then converted to a lower swing by a capacitive divider, which includes a series capacitor 116 between the driver output and a wire 118-1, and the wire capacitance. Note that this divider lowers the power relative to full-swing signaling while also increasing the bandwidth through pre-emphasis. Furthermore, this technique uses the normal power-supply signals, which reduces the complexity and the power consumption of the driver circuit 100.

Figure 2:
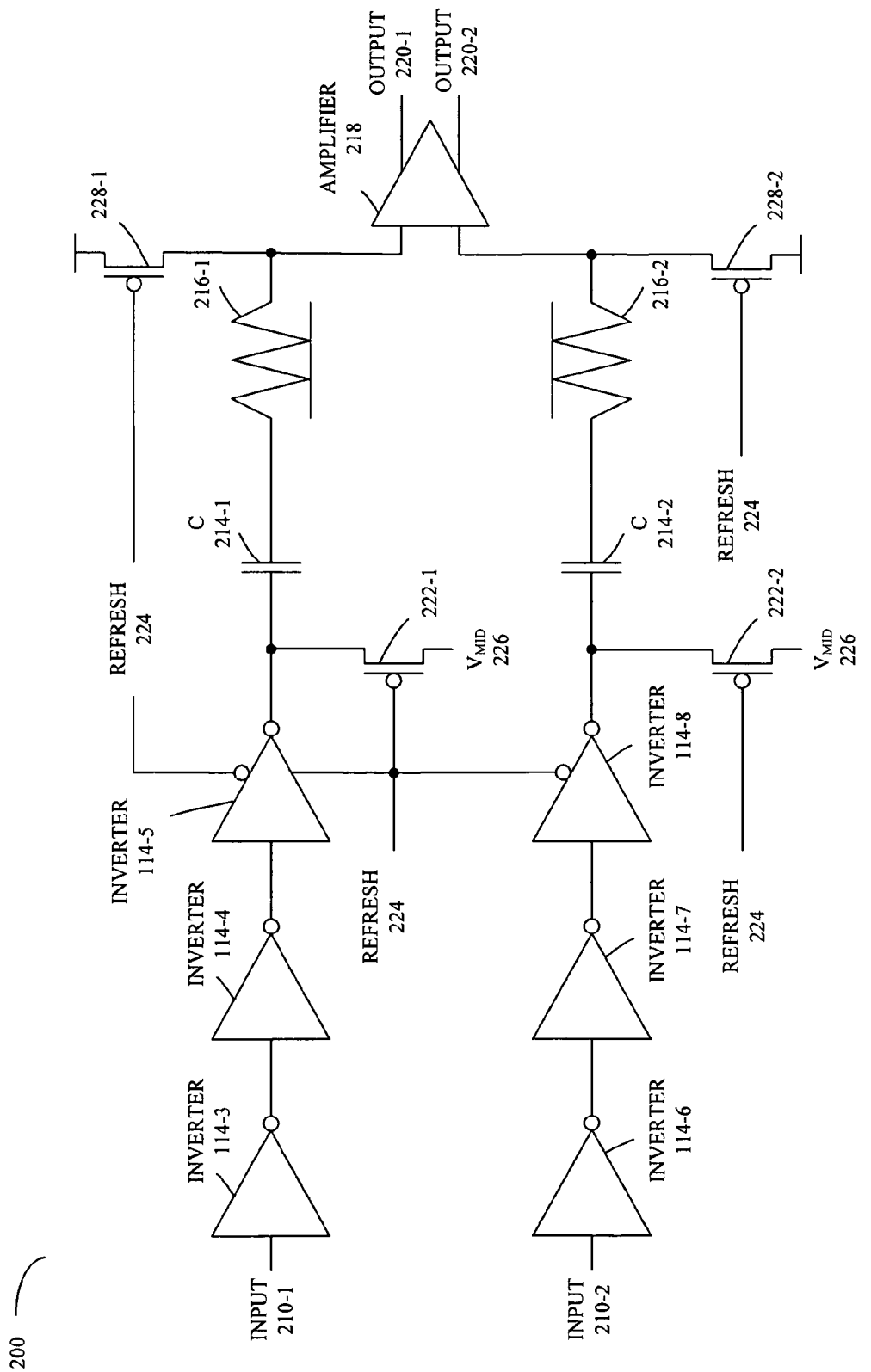
FIG. 2 is a block diagram illustrating an existing differential-driver circuit.

As noted previously, capacitively coupled drivers block the DC-voltage level of the transmitted signals. A technique for addressing this problem is shown in FIG. 2, which presents a block diagram illustrating an existing differential-driver circuit 200. In this circuit, inverters 114 receive inputs 210 and drive signals through coupling capacitors 214 and signal lines or links 216 to a receiver amplifier 218. This amplifier outputs received signals on outputs 220. Note that the links 216 are represented by a symbol that indicates the parallel resistance and capacitance in these connections. Furthermore, note that the capacitors 214 and the links 216 form a capacitive divider with a capacitive coupling ratio.

The DC-voltage level on the links 216 is reset during a refresh or calibration mode. In this mode, refresh signal 224 is asserted and inverters 114-5 and 114-8 are disabled. Then, the DC-voltage level of the transmitted signals is periodically refreshed using PMOS transistors 222, which are coupled to a voltage 226 that is midway between a signal level or voltage corresponding to a logical "0" and a voltage corresponding to a logical "1". Note that the DC-voltage level is also set by PMOS transistors 228 that couple to Vdd or some other voltage that establishes an effective common-mode operating voltage for amplifier 218.

Figure 3:
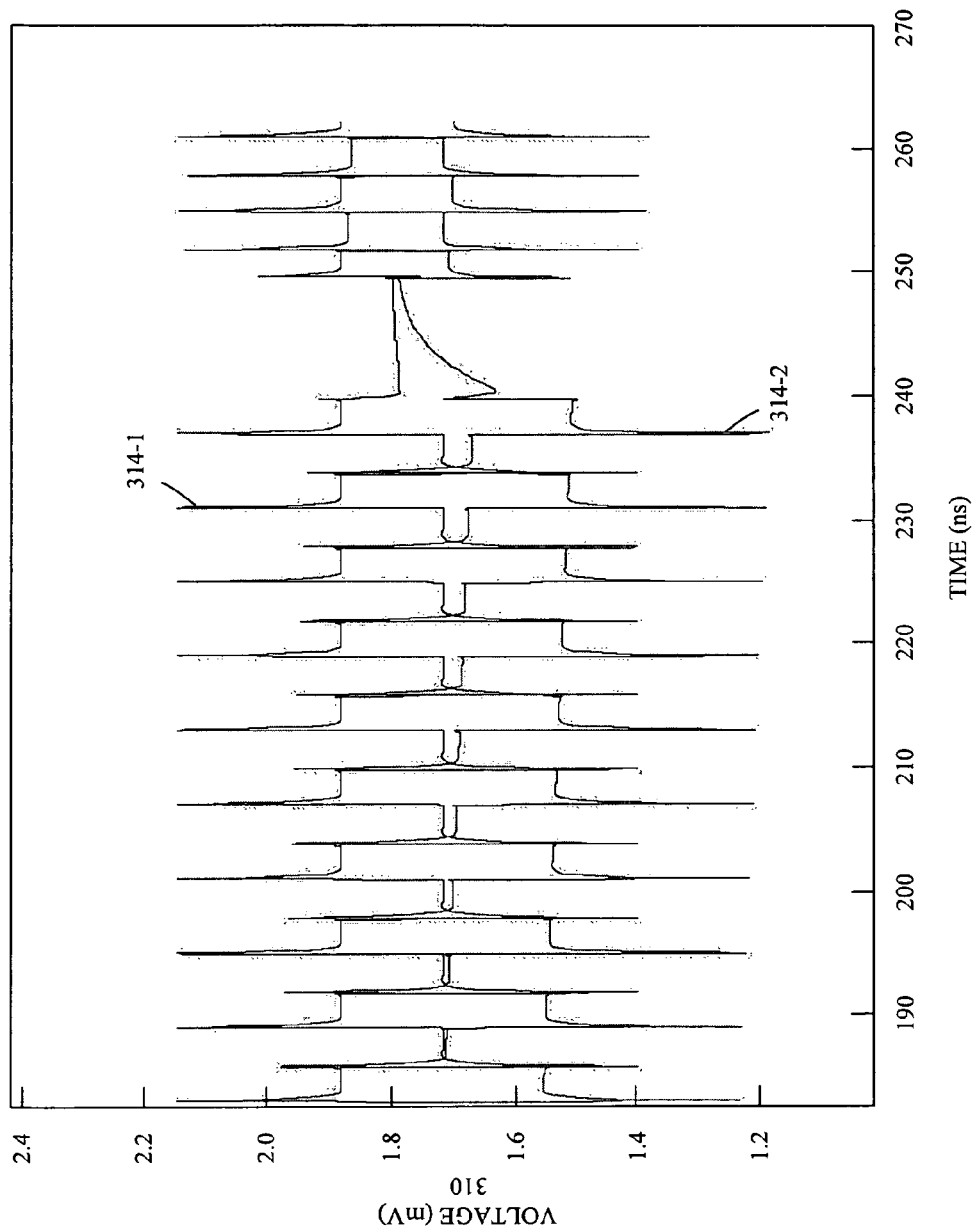
FIG. 3 is a block diagram illustrating simulated differential-driver waveforms for an existing driver circuit.

FIG. 3 presents a block diagram illustrating simulated differential-driver waveforms 314 in existing differential-driver circuit 200 (FIG. 2), which are plotted as voltage 310 as a function of time 312 since the DC-voltage level was last calibrated. In these simulations, the inverters 114 outputted a '01010101' pattern, and the capacitive coupling ratio and the inverters 114 were configured such that the amplitude of the signals output by the inverters 114 is 150 mV. Note that the waveforms 314 were simulated at a position to the right of the capacitors 214 in FIG.2.

Furthermore, in the simulations a leakage current of 1 μA was applied to link 216-1 (FIG. 2). While actual leakage is likely to be three orders of magnitude smaller, the larger leakage value allowed the simulation to demonstrate the response of differential-driver circuit 200 (FIG. 2) to leakage in a shorter time span. Note that significant voltage shifts occurr in the simulation results after 200 ns. Indeed, positive waveform 314-1 and negative waveform 314-2 in the differential signal completely separate. Therefore, recalibration was performed after 240 ns because these shifts will produce errors.

Figure 4:
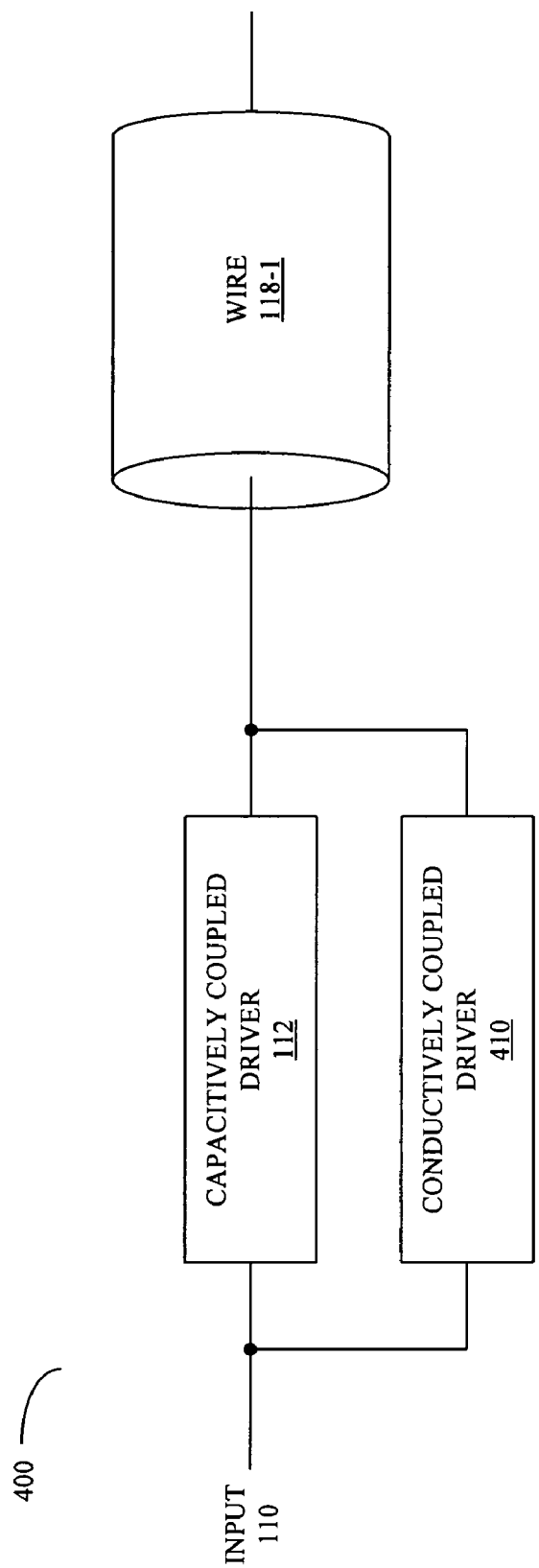
FIG. 4 is a block diagram illustrating a driver circuit in accordance with an embodiment of the present invention.

An embodiment of the present invention that maintains the DC-voltage level of the transmitted signals is shown in FIG. 4, which presents a block diagram illustrating a driver circuit 400. In this circuit, a conductively coupled driver 410 has been added in parallel with the capacitively coupled driver 112. Note that conductively coupled driver 410 sends the same polarity of information as the capacitively coupled driver 112 (albeit conductively instead of capacitively). However, rather than using a full-strength driver, conductively coupled driver 410 only acts as a keeper that weakly drives a given signal (such as one corresponding to a logical "1" or a logical "0") to hold or maintain the state of the signal after the capacitive coupled driver 112 has placed the majority of signal energy on the wire 118-1. Therefore, the conductively coupled driver 410 maintains the DC-voltage level without substantially changing the transition behavior in the signals provided by the capacitively coupled driver 112.

Figure 5:
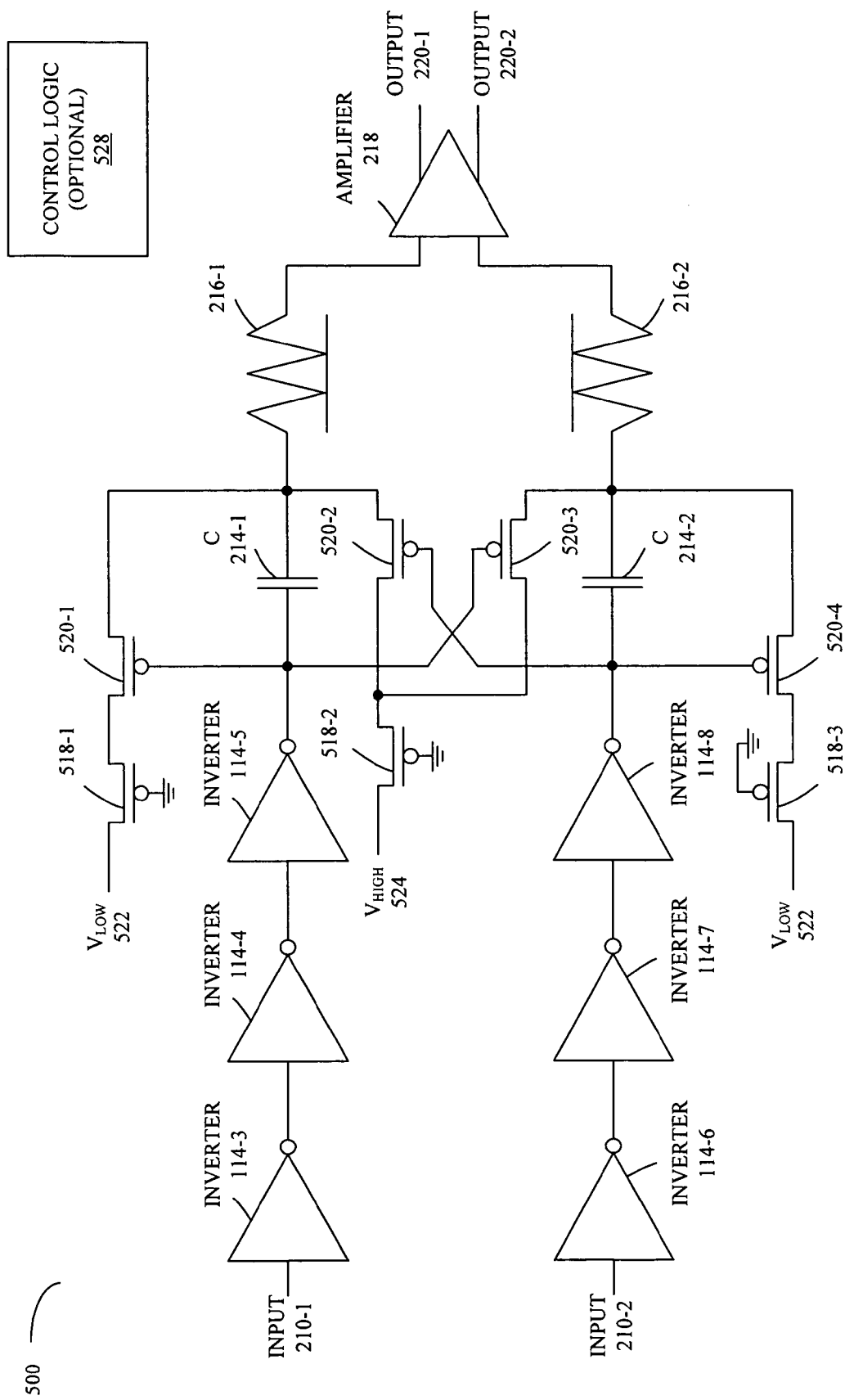
FIG. 5 is a block diagram illustrating a differential-driver circuit in accordance with an embodiment of the present invention.

One embodiment of the capacitively coupled driver 112 is shown in FIG. 5, which presents a block diagram illustrating a differential-driver circuit 500. In this circuit, a weak conductively coupled driver is used in each side of the differential driver. This driver has an RC time-constant that is long compared to the duration of the pre-emphasis spikes generated by the capacitively coupled driver, i.e., the transient characteristic of the transmitted signals. Note that R is a resistance of a conductive path in the conductively coupled driver and C is a total capacitance of the links 216.

In particular, PMOS pass gates 520 may be used to implement the conductively coupled driver. These conductive-driver transistors are switched based on the transmitted signals (i.e., the history of the transmitted signals), and are in series with high-resistance PMOS transistors 518 to lower the frequency response of the conductively coupled driver and to avoid attenuating the pre-emphasis. Furthermore, the PMOS transistors 518 are coupled to a low voltage 522 (i.e., a logical "0") and/or a high voltage 524 (i.e., a logical "1"). These voltages are used to set the DC-voltage level of the transmitted signals.

In some embodiments, differential-driver circuit 500 includes optional control logic 528 that is configured to adjust a frequency response of the differential-driver circuit 500 and/or the communication channel. Note that this control logic may be configured to adjust the frequency response continuously and/or after a pre-determined time interval has passed since a last adjustment.

Figure 6:
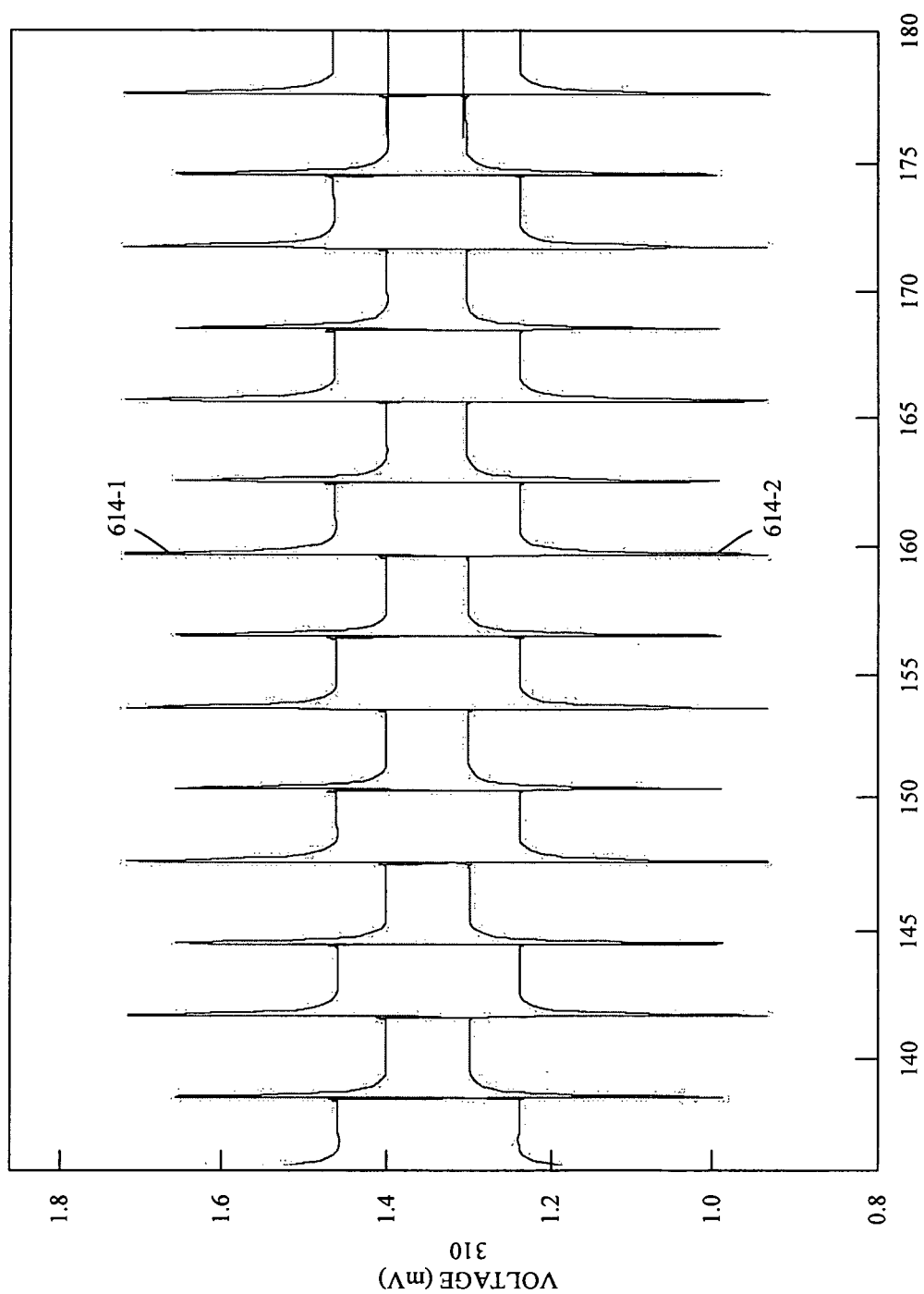
FIG. 6 is a block diagram illustrating simulated differential-driver waveforms in accordance with an embodiment of the present invention.

FIG. 6 presents a block diagram illustrating simulated differential-driver waveforms 614 (at a position to the right of the capacitors 214 in differential-driver circuit 500 in FIG. 5) in accordance with an embodiment of the present invention. These simulations were performed using the same conditions as the simulations shown in FIG. 3. The simulation results show that the differential-driver circuit 500 (FIG. 5) compensates for the leakage current and only suffers a 75 mV offset voltage. Under more realistic conditions (a leakage current of several nanoAmperes instead of 1 µA), the offset voltage would be reduced to several microVolts. Therefore, this circuit may not need recalibration. Moreover, by eliminate such an off-line condition the differential-driver circuit 500 (FIG. 5), as well as additional embodiments described below, may allow a communication channel to operate with approximately constant latency (i.e., constant delay) when communicating data via the links 216 (FIG. 5).

Note that it may not possible to reduce the offset voltage further in the differential-driver circuit 500 (FIG. 5) by simply decreasing the output resistance of the conductively coupled driver. This is because there is a tradeoff between impact on the offset voltage due to leakage current and the attenuation of the pre-emphasis spike. In particular, a smaller resistance reduces the offset voltage, while a larger resistance reduces the attenuation. Thus, the conductively coupled driver reduces the pre-emphasis due to the addition of a new low frequency pole. For example, in the simulations this pole reduces the initial pre-emphasis spike from an amplitude of 260 mV to 250 mV.

Figure 7:
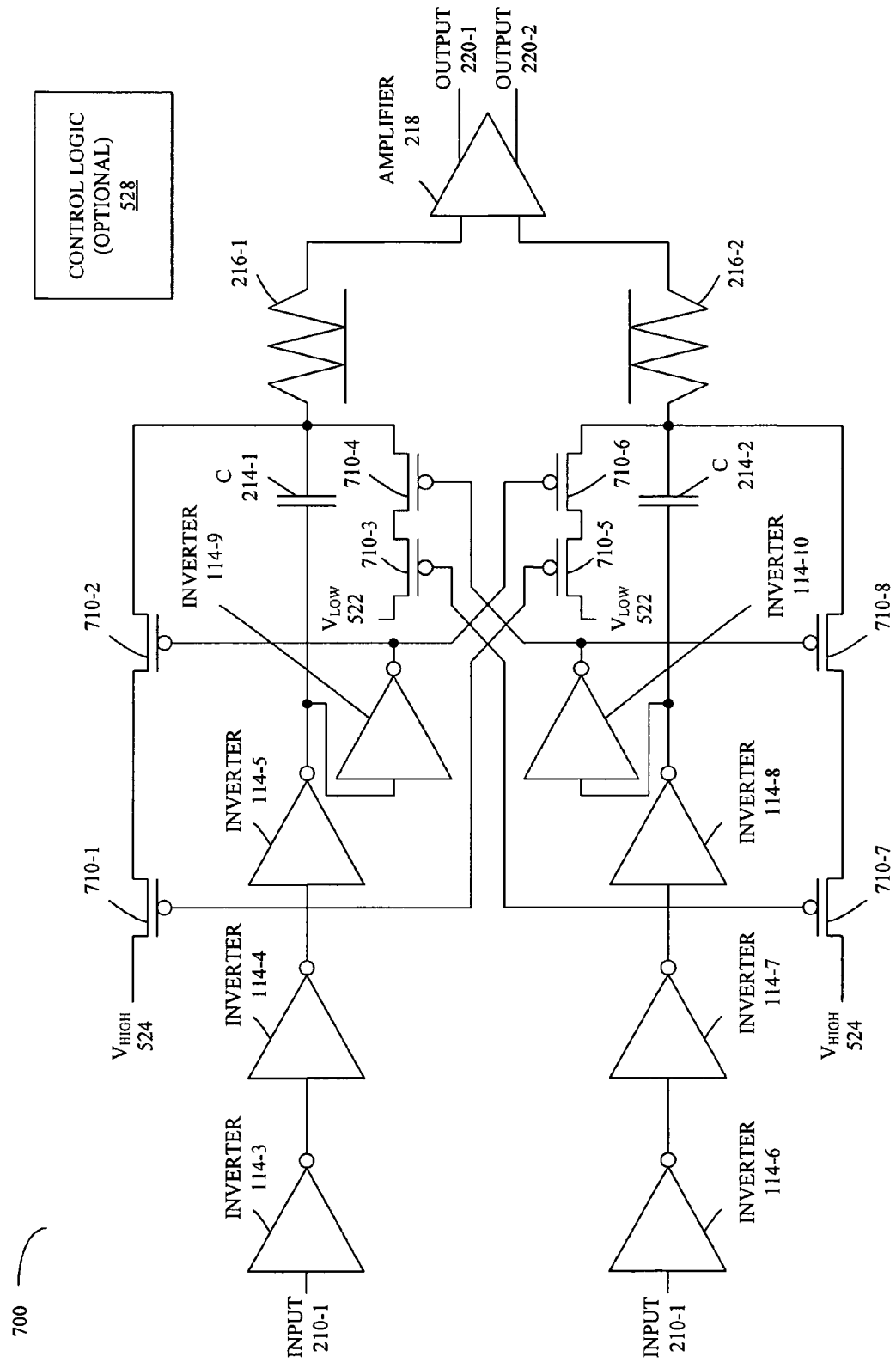
FIG. 7 is a block diagram illustrating a differential-driver circuit in accordance with an embodiment of the present invention.

A technique to address this problem is shown in FIG. 7, which presents a block diagram illustrating a differential-driver circuit 700 in accordance with an embodiment of the present invention. In this circuit, the conductively coupled driver uses pairs of series-connected PMOS switches 710 to implement a break-before-make switch that tri-states (or goes to extremely high impedance) during transitions in the transmitted signals. This conductively coupled driver can eliminate the above-described resistance tradeoff. In particular, as long as the conductively coupled driver tri-states during the pre-emphasis spike, a high-resistance driver is no longer required to avoid attenuating that pre-emphasis spike. Thus, the RC time-constant of the conductively coupled driver in differential-driver circuit 700 may be smaller than the duration of the pre-emphasis spike.

In some embodiments, the time interval during which the conductively coupled driver tri-states may be adjustable. For example, optional control logic 528 may use a multiplexer to select the number of inverters in each side of the differential driver, thereby setting a delay. Furthermore, in some embodiments an adjustable delay element may be included between the inverters 114-9 and 114-10 and the PMOS switches 710. This delay element may have discrete time delays and/or continuous time delays.

Figure 8:
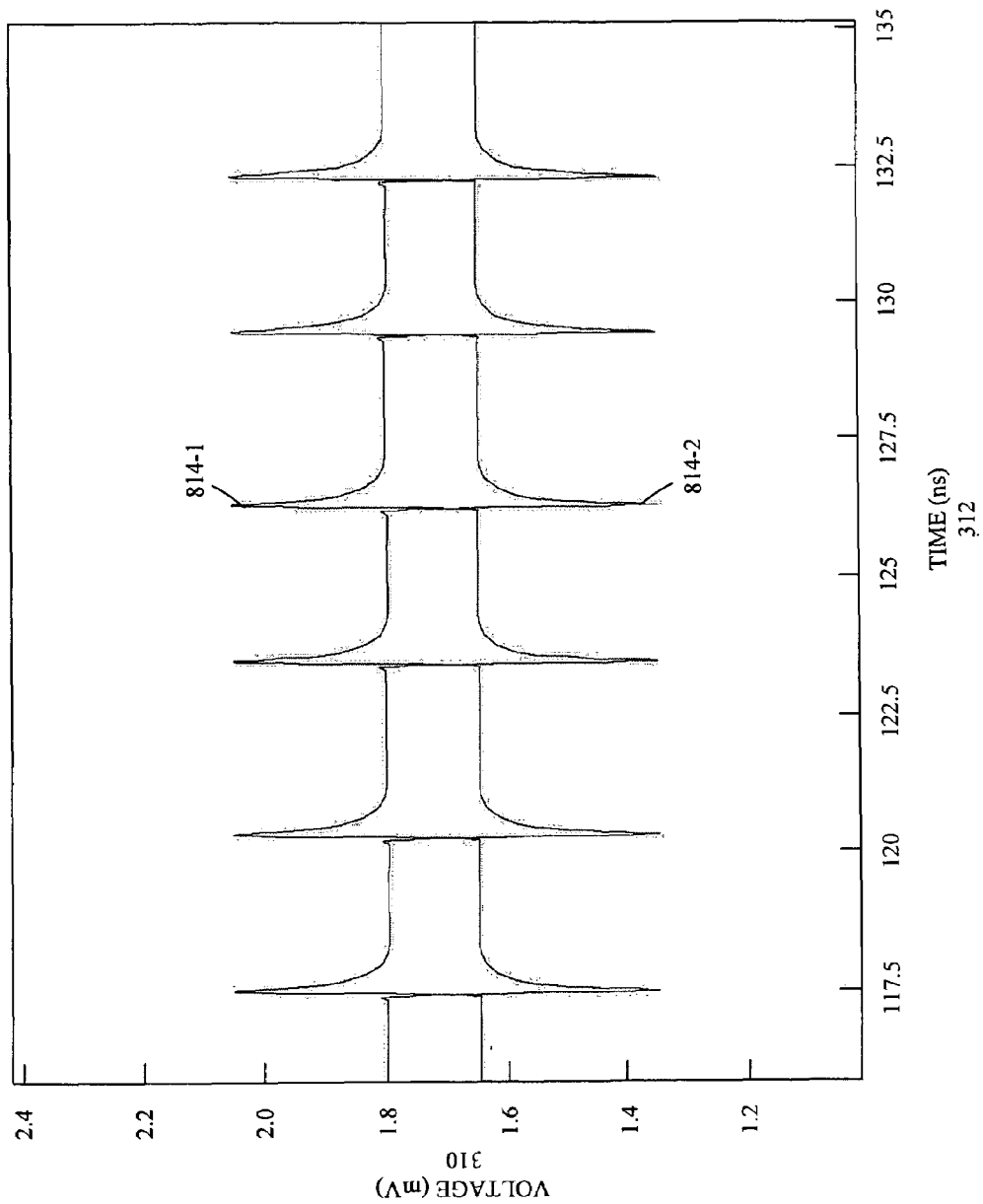
FIG. 8 is a block diagram illustrating simulated differential-driver waveforms in accordance with an embodiment of the present invention.

FIG. 8 presents a block diagram illustrating simulated differential-driver waveforms 814 (at a position to the right of the capacitors 214 in differential-driver circuit 700 in FIG. 7) in accordance with an embodiment of the present invention. These simulations were performed using the same conditions as the simulations shown in FIGS. 3 and 5. Note that on the time scale shown in FIG. 8, it is difficult to see any offset induced by the leakage current.

Figure 9:
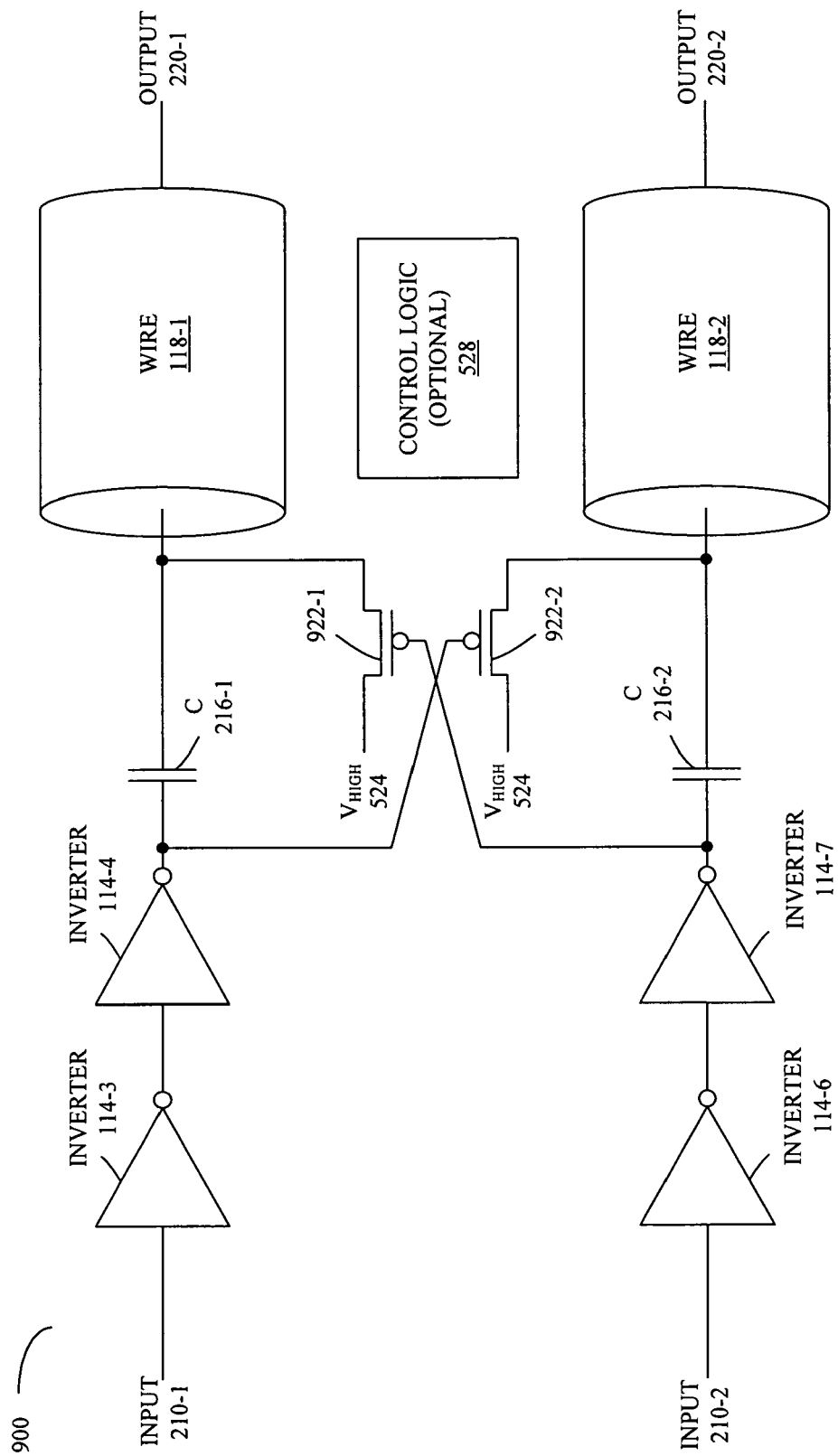
FIG. 9 is a block diagram illustrating a differential-driver circuit in accordance with an embodiment of the present invention.

Another embodiment of the capacitively coupled driver 112 (FIG. 4) is shown in FIG. 9, which presents a block diagram illustrating a differential-driver circuit 900. In this circuit, the conductively coupled drivers use PMOS gates 922 to implement break-before-make switching in each side of the differential driver. Furthermore, the conductively coupled driver only drives high-signal levels onto the wires 118. This driver floats for low-signal levels. However, if the transmitted signals have occasional transitions then this driver will effectively handle leakage currents. In particular, this circuit requires some maximum run length, but does not require DC balancing. For example, for leakage currents of several nanoAmperes, the transmitted signals may only need a transition every few milliseconds to maintain low leakage-induced offset voltages. For a gigabit-per-second data rate, the overhead for encoding to ensure occasional transitions can be easily less than a fraction of a percent.

Note that while the conductively coupled drivers in FIG. 9 are illustrated as tri-stating when a signal corresponding to logical "0" is output from the inverters 114-4 and/or 114-7, in other embodiments the conductively coupled drivers may tri-state when a signal corresponding to a logical "1" is output. Furthermore, note that in some embodiments a different number of inverter stages may be included or selected (for example, using the optional control logic 528) between the two taps of the PMOS gates 922 and the coupling capacitor 216. These additional stages provide different relative delays that may be useful depending on the duration of the pre-emphasis spike.

In general, any of the PMOS embodiments can be converted to an NMOS version (and vice versa). One may wish to use NMOS embodiments to drive DC-bias levels onto the wires 118 (FIGS. 5, 7, and 9) that are closer to ground rather than Vdd. (Note that PMOS devices drive well near Vdd but do not pass ground voltages.) For most embodiments, the conversion entails swapping the $V_{LOW}$ 522 (FIGS. 5, 7, and 9) and $V_{HIGH}$ 524 (FIGS. 5, 7 and 9) bias-level locations. Furthermore, in embodiments with AND or NAND logic, the logic is switched to provide active-high rather than active-low values to the gates of the NMOS transistors.

Figure 10:
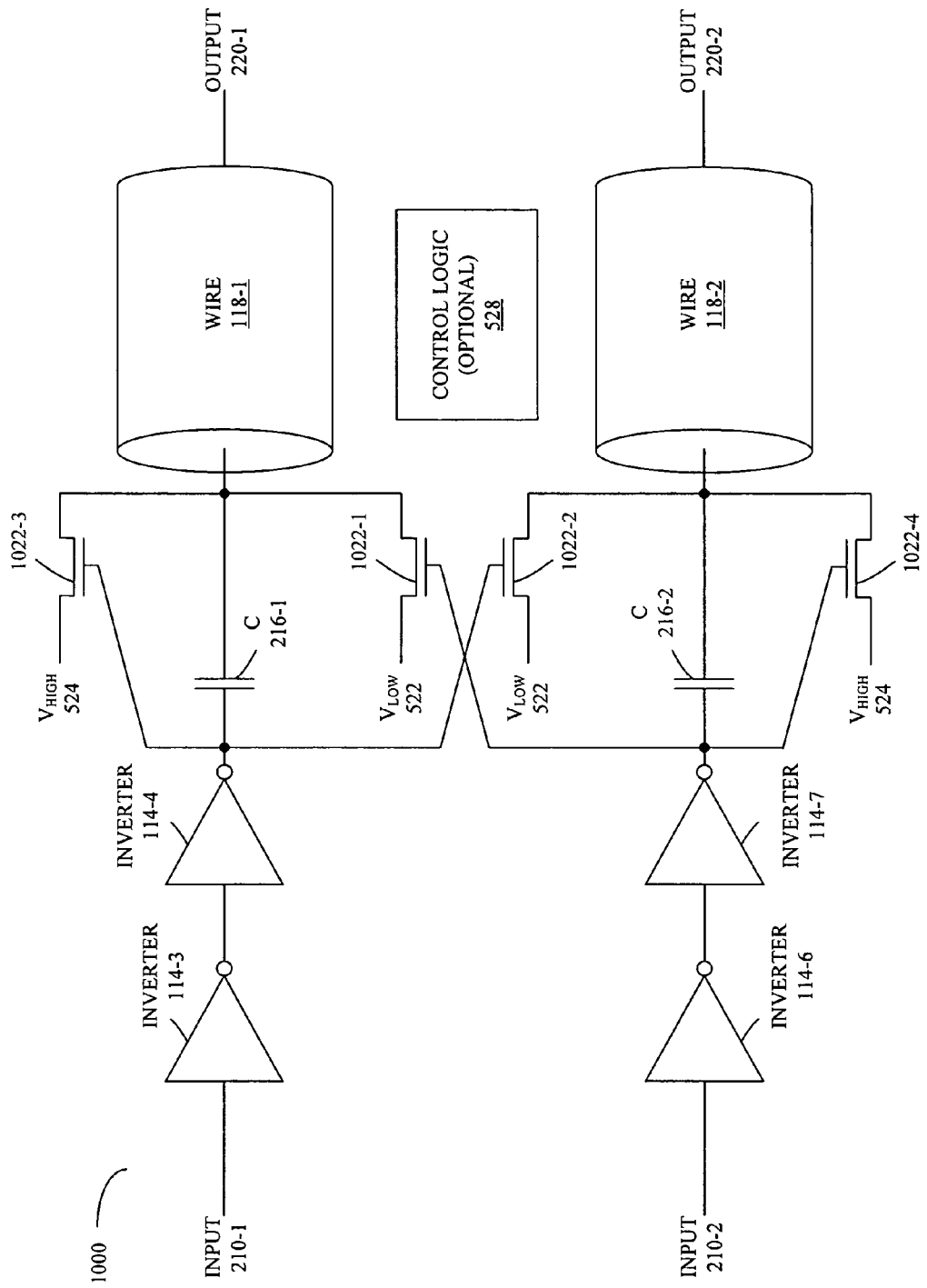
FIG. 10 is a block diagram illustrating a differential-driver circuit in accordance with an embodiment of the present invention.
Figure 11:
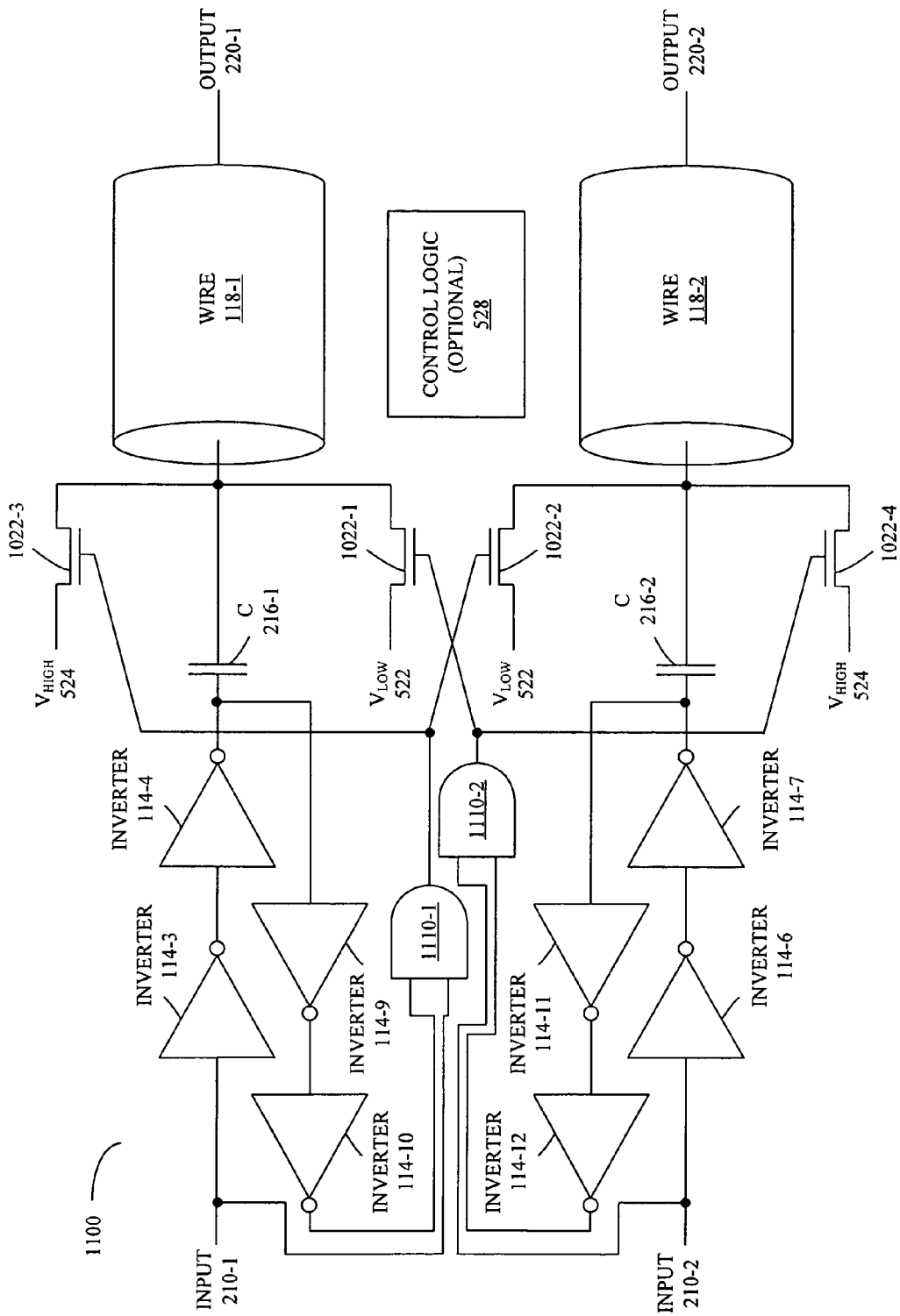
FIG. 11 is a block diagram illustrating a differential-driver circuit in accordance with an embodiment of the present invention.

Embodiments of a differential-driver circuit that include conductively coupled drivers using NMOS transistors 1022 are shown in FIGS. 10 and 11. Differential-driver circuit 1000 illustrates conductively coupled drivers that drive both high and low DC-voltage levels onto the wire 118, while differential-driver circuit 1100 illustrates conductively coupled drivers that blank the conductive output during transitions in the transmitted signals.

Note that different arrangements of pulse-delay taps can implement other delay settings as appropriate for a given circuit and wire technology or design. Furthermore, in some embodiments the optional control logic 528 adjusts this delay. For example, in differential-driver circuit 1100 the inverters 114 and AND gates 1110 provide a four-gate-delay blanking period from about one-gate delay before to about three-gate delays after a transition. However, for an extremely long wire 118 the pulse width of the capacitively coupled pre-emphasis spike may be longer than three-gate delays. In this case, two or more additional inverters 114 could be inserted before the later-arriving input to the AND gates 1110.

Note that in embodiments with PMOS transistors, the blanking conductively coupled driver use series-gating conductive switches, whereas the NMOS embodiment shown in FIG. 11 uses AND gates 1110 with a single conductive switch in each of the four conductively coupled paths. Thus, by appropriately swapping the DC-biasing voltages and the logic activation level (for instance by using a NAND gate rather than an AND gate) the NMOS embodiment may be converted into a PMOS embodiment (and vice versa).

Furthermore, in embodiments where the conductively coupled drivers output both high and low levels, the difference between the high and low DC-voltage levels may equal the capacitively coupled voltage swing. If this is not the case, the difference in the voltage swing becomes an error that subtracts from the transmitted signal for some patterns. These high and low levels may be generated using an estimate of the series-to-wire capacitance, or to track process variations, using a control loop (which may include the optional control logic 528). This control loop may monitor a model of the capacitively coupled driver circuit and generate a difference between high and low levels that matches the capacitively coupled voltage swing.

Note that in some embodiments differential-driver circuit 500 (FIG. 5), differential-driver circuit 700 (FIG. 7), differential-driver circuit 900 (FIG. 9), differential-driver circuit 1000 (FIG. 10), and/or differential-driver circuit 1100 (FIG. 11) include fewer or additional components, two or more components are combined into a single component, and/or a position of one or more components may be changed. For example, in some embodiments a voltage-mode driver and/or a current-mode driver is used. Furthermore in some embodiments additional voltage levels may be used, such as in multiple-pulse amplitude modulation (multi-PAM). And in other embodiments, the DC-voltage level is maintained using clamps (such as diodes) in conjunction with a component that includes hysteresis based on the signal history (such as, a Schmitt trigger).

In some embodiments, single-ended or differential-mode circuits are used in the transmit drivers and/or receiver amplifiers. Differential-mode circuits have more noise tolerance and may be more applicable as signal swings decrease. In these circuits, the complementary signals used to drive the conductively coupled switches may be taken from the complementary path, thereby reducing some of the circuit overhead in comparison with a single-ended implementation. Furthermore, in some embodiments equalization is used to reduce and/or eliminate losses in the wires and to increase bandwidth beyond what can be achieved using a pre-emphasis boost through the series capacitor. For example, the capacitive coupling may add signals from multi-tap finite-impulse-response (FIR) filters. Thus, the DC biasing technique described above may be modified to include a FIR filter that dynamically changes the effective DC-bias voltage based on the transmitted-signal sequence and tap weights in the capacitively coupled path.

Figure 12:
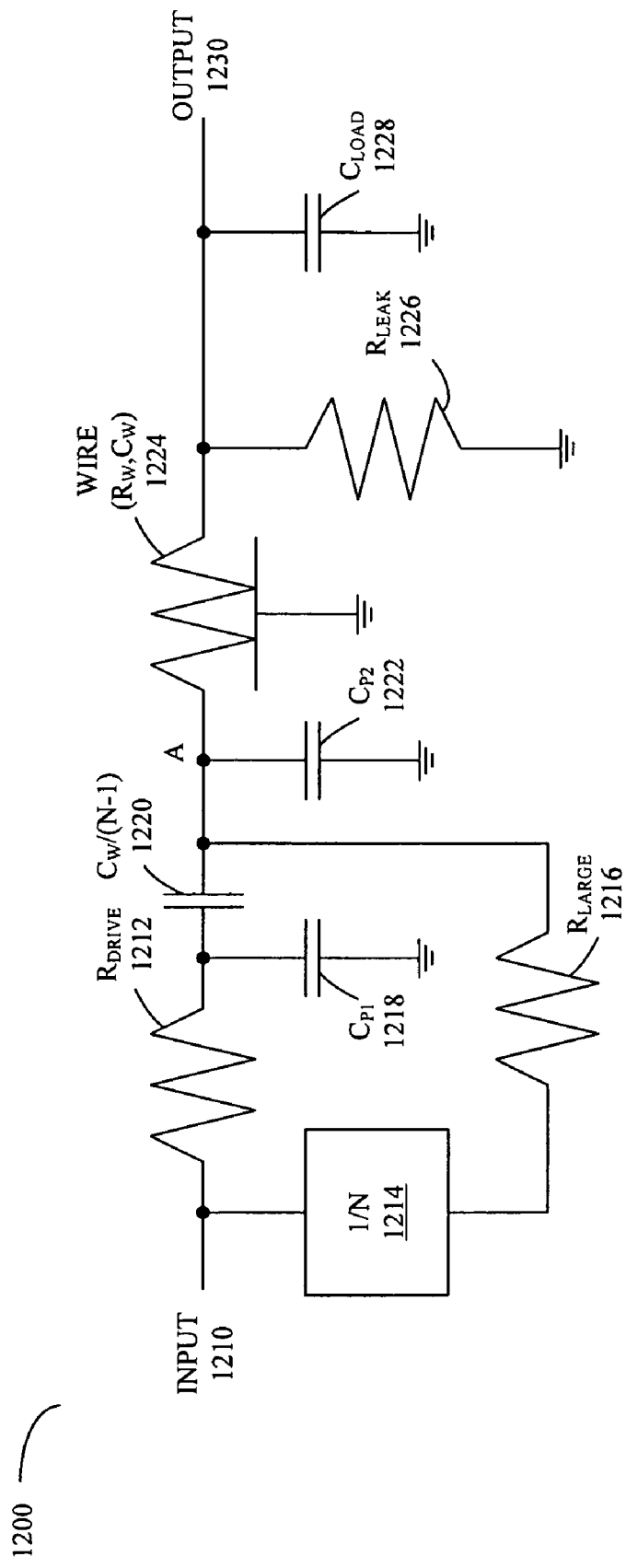
FIG. 12 is a block diagram illustrating a small-signal model of a differential-driver circuit in accordance with an embodiment of the present invention.

We now describe models of the differential-driver circuit. FIG. 12 presents a block diagram illustrating a small-signal model 1200 of a differential-driver circuit in accordance with an embodiment of the present invention. In this model, non-linear elements such as CMOS inverters have been approximated by their small-signal resistances and capacitances.

Consider the path from input 1210 to node A. At low frequencies, the full capacitance $C_W$ of the wire 1224 is seen in the frequency transfer function. However, at high frequencies the distributed resistance $R_W$ in the wire 1224 hides much of the capacitance $C_W$. Furthermore, depending on the length of the wire 1224 the path from node A to output 1230 may attenuate much of the high frequency content of the pre-emphasized transmit signal.

Resistor $R_{DRIVE}$ 1212 models the resistance of the last stage of the capacitively coupled driver that connects to coupling capacitor $C_W/(N-1)$ 1220, and resistor $R_{LARGE}$ 1216 models the resistance of the conductively coupled driver. This resistance is typically large compared to $R_{DRIVE}$ 1212 but is small compared to resistor $R_{LEAK}$ 1226, which models the leakage path(s) that would set the DC-bias voltage on the wire 1224 in the absence of any other mechanism. Note that in embodiments with a tri-stating conductively coupled driver, $R_{LARGE}$ 1216 may approach infinity during the transition time.

Capacitor $C_{P1}$ 1218 models parasitic capacitance in the driver, and due to the wire 1224 and the coupling capacitor $C_W/(N-1)$ 1220. In addition, capacitor $C_{P2}$ 1222 models parasitic capacitance from the coupling capacitor $C_W/(N-1)$ 1220 and the conductively coupled driver. Note that the value of the coupling capacitor $C_W/(N-1)$ 1220 results in a normalized swing of about 1/N. Block 1/N 1214 ensures that the conductively coupled driver is driven with the same signal. Furthermore, $C_{LOAD}$ 1228 models the input capacitance of the receiver at the end of the wire 1224.

Figure 13A:
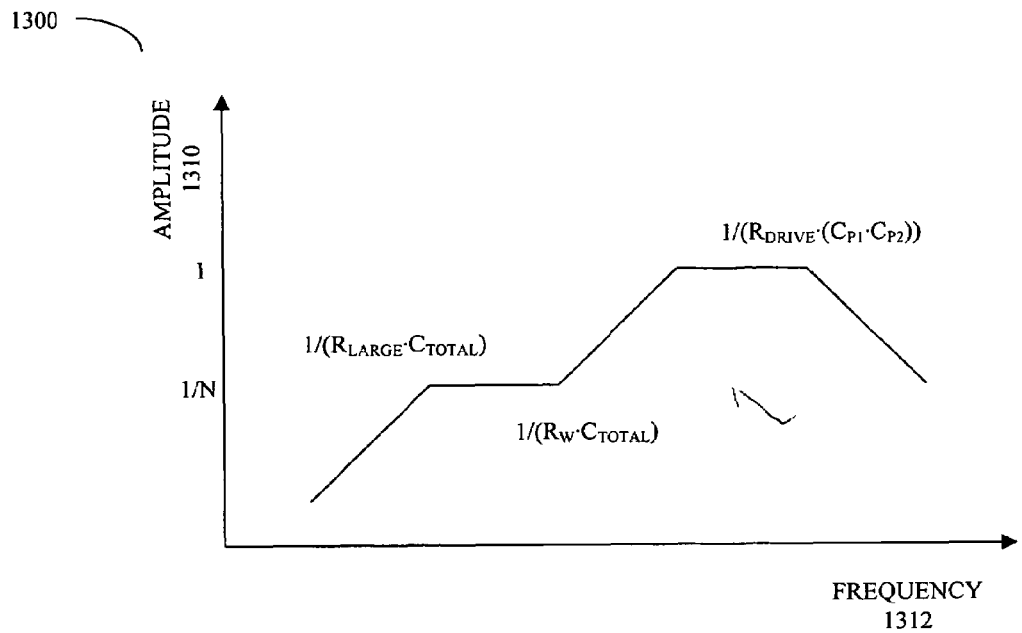
FIG. 13A is a block diagram illustrating a transfer function in accordance with an embodiment of the present invention.
Figure 13B:
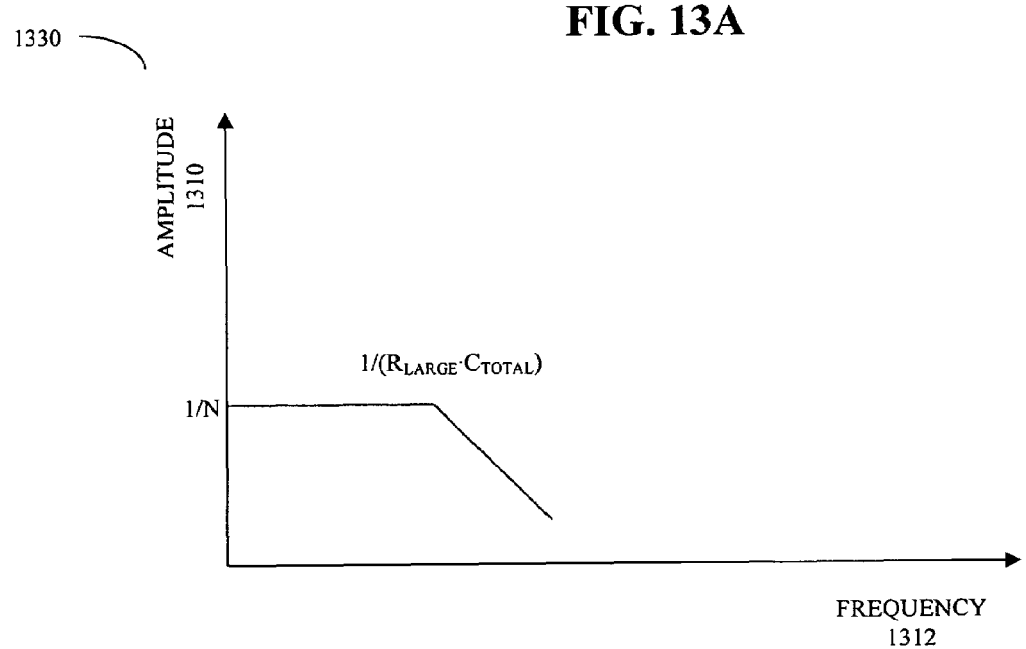
FIG. 13B is a block diagram illustrating a transfer function in accordance with an embodiment of the present invention.
Figure 13C:
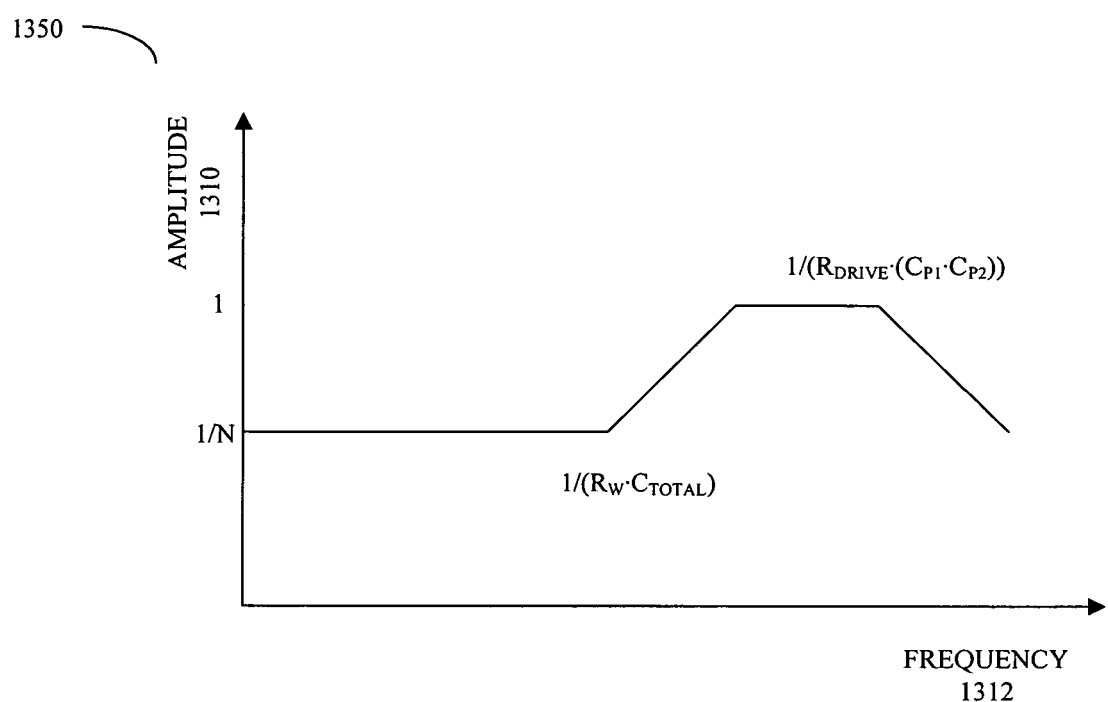
FIG. 13C is a block diagram illustrating a transfer function in accordance with an embodiment of the present invention.

FIGS. 13A-13C presents block diagrams illustrating transfer functions 1300, 1330, and 1350 in accordance with an embodiment of the present invention, which are plotted as amplitude 1310 (normalized to the signal on the input 1210 in FIG. 12 10) as a function of frequency 1312. Transfer function 1300 corresponds to the capacitively coupled path between the input 1210 and node A. While this transfer function is qualitative, the poles and zeros (roll-off frequencies) are labeled at their approximate frequencies. Note that the actual transfer function is rather complex, but the listed frequency expressions are useful first-order estimates that help to guide understanding of the important relationships in the differential-driver circuit.

The capacitively coupled path provides a useful high frequency pre-emphasis boost to counteract attenuation in the wire. In transfer function 1300, this is seen by the peaking of the signal amplitude from approximately 1/N to 1. However, as we have discussed previously, the capacitively coupled path also blocks the DC-signal content.

If the conductively coupled driver were absent then the low-frequency pole in the transfer function 1300 would be at approximately $(R_{LEAK} \cdot C_W)^{-1}$, because at low frequencies the resistance of the wire is inconsequential. As a consequence, the low-frequency pole would be set by the leakage resistor $R_{LEAK}$ 1226 and the sum of all capacitances on and between node A and the output 1230 (which is denoted by $C_{TOTAL}$).

With the inclusion of the conductively coupled driver, the additional resistor $R_{LARGE}$ 1216 provides a parallel path to $R_{LEAK}$ 1226. Therefore, $R_{LARGE}$ 1216 will likely be a much smaller resistance and hence will dominate and set the low-frequency pole in the conductively coupled transfer function 1330 to approximately $(R_{LARGE} \cdot C_{TOTAL})^{-1}$. This is a much higher frequency than the frequency when the conductively coupled driver was absent. Note that the low-swing signal is set to have an amplitude of approximately 1/N of the signal on the input 1210, thereby matching the capacitively coupled signal swing. Furthermore, this conductively coupled path has a transfer range from DC up to about the same frequency for which the capacitively coupled path begins to transfer signal. These corner frequencies are substantially similar because they are set by the same combination of circuit elements, i.e., $R_{LARGE}$ 1216 and $C_{TOTAL}$.

As shown in the combined transfer function 1350, the product of transfer functions 1300 and 1350 provides the high-frequency pre-emphasis while also transferring DC-signal content. Therefore, note that in some embodiments a frequency response of the communication channel is approximately uniform from DC up to a frequency. Furthermore, note that in some embodiments optional control logic 528 (FIGS. 5, 7, 9, 10, and 11) may adjust the driver circuit to obtain a transfer function that better approximates this condition.

Figure 14:
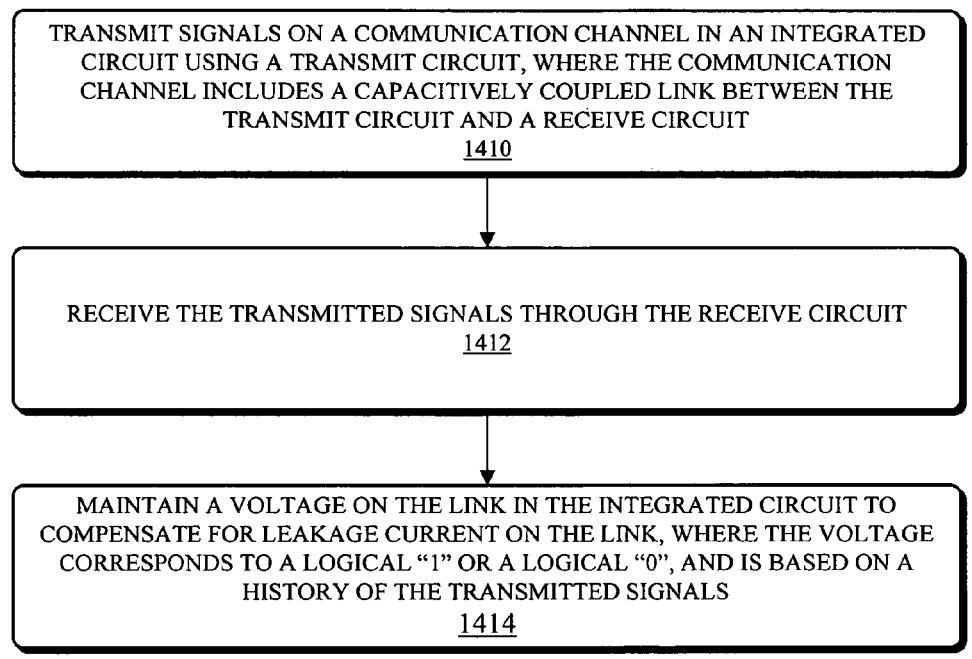
FIG. 14 is a flow chart illustrating a process for maintaining a voltage on a link in an integrated circuit in accordance with an embodiment of the present invention.

We now discuss methods for maintaining a voltage on a link. FIG. 14 presents a flow chart illustrating a process 1400 for maintaining a voltage on a link in an integrated circuit in accordance with an embodiment of the present invention. During this process, a transmit circuit transmits signals on a communication channel in an integrated circuit (1410). Note that the communication channel includes a capacitively coupled link between the transmit circuit and a receive circuit. Then, the receive circuit receives the transmitted signals (1412). Next, a clamping circuit maintains a voltage on a link in the integrated circuit to compensate for leakage current on the link (1414). Furthermore, this voltage corresponds to a logical "1" or a logical "0", and is based on a history of the transmitted signals. Note that in some embodiments of the process 1400 there may be additional or fewer operations, the order of the operations may be changed, and two or more operations may be combined into a single operation.

Figure 15:
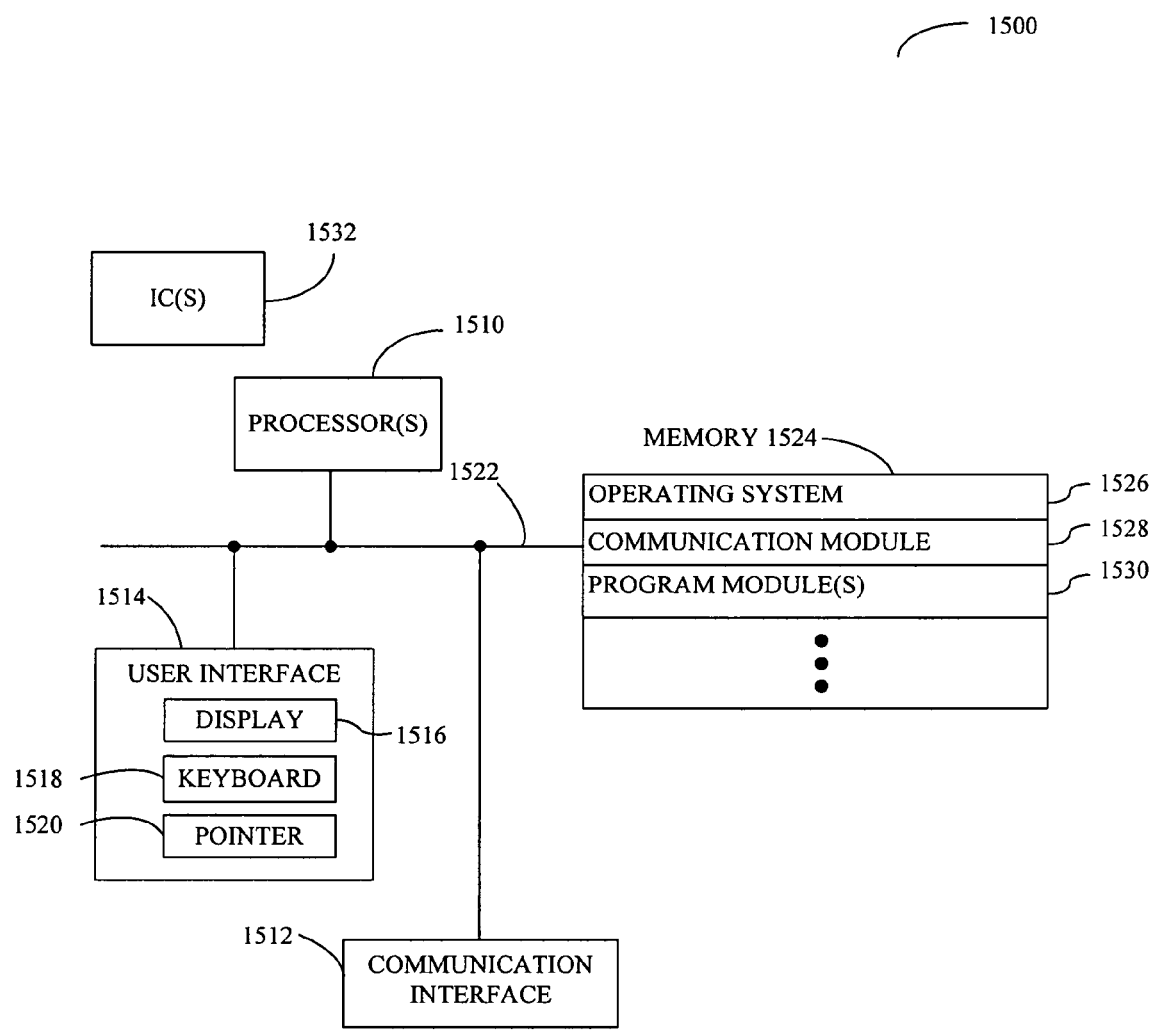
FIG. 15 is a block diagram illustrating a computer system in accordance with an embodiment of the present invention.

We now described computer systems that may include embodiments of the driver circuit and/or which may implement embodiments of the process. FIG. 15 presents a block diagram illustrating a computer system 1500 in accordance with an embodiment of the present invention. The computer system 1500 includes one or more processors 1510, a communication interface 1512, a user interface 1514, and one or more signal lines 1522 coupling these components together. Note that the one or more processing units 1510 may support parallel processing and/or multi-threaded operation, the communication interface 1512 may have a persistent communication connection, and the one or more signal lines 1522 may constitute a communication bus. Moreover, the user interface 1514 may include a display 1516, a keyboard 1518, and/or a pointer 1520, such as a mouse.

Memory 1524 in the computer system 1500 may include volatile memory and/or non-volatile memory. More specifically, memory 1524 may include ROM, RAM, EPROM, EEPROM, FLASH, one or more smart cards, one or more magnetic disc storage devices, and/or one or more optical storage devices. Memory 1524 may store an operating system 1526 that includes procedures (or a set of instructions) for handling various basic system services for performing hardware dependent tasks. The memory 1524 may also store procedures (or a set of instructions) in a communication module 1528. The communication procedures may be used for communicating with one or more computers and/or servers, including computers and/or servers that are remotely located with respect to the computer system 1500. Memory 1524 may also include multiple program modules (or a set of instructions).

Note that instructions in the various modules in the memory 1524 may be implemented in a high-level procedural language, an object-oriented programming language, and/or in an assembly or machine language. The programming language may be compiled or interpreted, i.e, configurable or configured to be executed by the one or more processing units 1510.

Furthermore, the computer system 1500 may include one or more integrated circuits (ICs) 1532. Signals in these ICs may be communicated on-chip via capacitively coupled communication channels. Furthermore, these ICs may include conductively coupled drivers to maintain the DC-voltage level during the on-chip communication.

Although the computer system 1500 is illustrated as having a number of discrete components, FIG. 15 is intended to be a functional description of the various features that may be present in the computer system 1500 rather than as a structural schematic of the embodiments described herein. In practice, and as recognized by those of ordinary skill in the art, the functions of the computer system 1500 may be distributed over a large number of servers or computers, with various groups of the servers or computers performing particular subsets of the functions. In some embodiments, some or all of the functionality of the computer system 1500 may be implemented in one or more ASICs and/or one or more digital signal processors DSPs.

The computer system 1500 may include fewer components or additional components, two or more components may be combined into a single component, and/or a position of one or more components may be changed. In some embodiments the functionality of the computer system 1500 may be implemented more in hardware and less in software, or less in hardware and more in software, as is known in the art.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclo-

What is claimed is:

1. An integrated circuit containing a communication channel, wherein the communication channel comprises:
a transmit circuit configured to transmit signals;
a link coupled to an output of the transmit circuit;
a receive circuit coupled to the link, wherein the transmit circuit is capacitively coupled to the receive circuit via the link; and
a clamping circuit coupled to the link, wherein the clamping circuit is configured to compensate for leakage current on the link by maintaining a voltage on the link corresponding to a logical "1" or a logical "0", and wherein the voltage is based on a history of the transmitted signals.

2. The integrated circuit of claim 1, wherein the transmit circuit includes a voltage-mode driver or a current-mode driver.

3. The integrated circuit of claim 1, wherein the clamping circuit sets a DC bias voltage of the link.

4. The integrated circuit of claim 1, wherein the clamping circuit includes a conductive driver in parallel with the link.

5. The integrated circuit of claim 1, wherein the clamping circuit is configured to disable the conductive driver for a given signal type in the transmitted signals, and wherein the given signal type corresponds to one of the logical "1" and the logical "0".

6. The integrated circuit of claim 5, wherein the transmitted signals are constrained to include a signal transition within a pre-determined time interval from a previous signal transition.

7. The integrated circuit of claim 1, wherein the clamping circuit has an RC time-constant that is greater than a time-constant of a transient characteristic of the transmitted signals;
wherein R is a resistance of a conductive path in the clamping circuit, and C is a total capacitance of the link; and
wherein the transient characteristic provides pre-emphasis to the receive circuit.

8. The integrated circuit of claim 1, wherein the clamping circuit is configured to disable the conductive driver for times less than a specified time interval, and to enable the conductive driver for times greater than the specified time interval.

9. The integrated circuit of claim 8, wherein the specified time interval corresponds to a transient characteristic of the transmitted signals, and wherein the transient characteristic provides pre-emphasis to the receive circuit.

10. The integrated circuit of claim 8, wherein the specified time interval of the clamping circuit is configured to be set using an adjustable delay element that has discrete time delays.

11. The integrated circuit of claim 8, wherein the specified time interval of the clamping circuit is configured to be set using an adjustable delay element that has continuous time delays.

12. The integrated circuit of claim 8, wherein the clamping circuit is configured to maintain the voltage for times longer than the specified time interval.

13. The integrated circuit of claim 1, wherein a frequency response of the communication channel is approximately uniform from DC up to a frequency.

14. The integrated circuit of claim 1, further including control logic, wherein the control logic is configured to adjust a frequency response of the clamping circuit.

15. The integrated circuit of claim 14, wherein the control logic is configured to adjust the frequency response after a pre-determined time interval has passed since a last adjustment.

16. The integrated circuit of claim 14, wherein the control logic is configured to adjust the frequency response continuously.

17. The integrated circuit of claim 1, wherein the integrated circuit has an approximately constant latency when communicating data via the link.

18. The integrated circuit of claim 1, wherein the receive circuit includes a single-ended amplifier or a differential amplifier.

19. A computer system, comprising:
a processor;
memory, wherein the memory is configured to store one or more program module mechanisms; and
an integrated circuit containing a communication channel, wherein the communication channel includes:
a transmit circuit configured to transmit signals;
a link coupled to an output of the transmit circuit;
a receive circuit coupled to the link, wherein the transmit circuit is capacitively coupled to the receive circuit via the link; and
a clamping circuit coupled to the link, wherein the clamping circuit is configured to compensate for leakage current on the link by maintaining a voltage on the link corresponding to a logical "1" or a logical "0", and wherein the voltage is based on a history of the transmitted signals.

20. A method for maintaining a voltage on a link in an integrated circuit, comprising:
transmitting signals on a communication channel in the integrated circuit using a transmit circuit, wherein the communication channel includes a capacitively coupled link between the transmit circuit and a receive circuit;
receiving the transmitted signals through the receive circuit; and
maintaining a voltage on the link to compensate for leakage current on the link, wherein the voltage corresponds to a logical "1" or a logical "0", and wherein the voltage is based on a history of the transmitted signals.

* * * * *